United States Patent
Kaneko

[19]
[11] Patent Number: 5,833,024
[45] Date of Patent: Nov. 10, 1998

[54] AUTOMOTIVE HOOD STRUCTURE

[75] Inventor: Takashi Kaneko, Hamamatsu, Japan

[73] Assignee: Suzuki Motor Corporation, Shizuoka-ken, Japan

[21] Appl. No.: 858,896

[22] Filed: May 19, 1997

Related U.S. Application Data

[63] Continuation of Ser. No. 445,185, May 19, 1995, abandoned.

[30] Foreign Application Priority Data

Sep. 6, 1994 [JP] Japan .................................. 6-211648

[51] Int. Cl.$^6$ .................................................. B62D 25/12
[52] U.S. Cl. ...................... 180/69.2; 180/69.21; 248/903; 292/DIG. 14; 292/DIG. 42
[58] Field of Search .............................. 180/69.2, 69.21; 248/903; 292/DIG. 14, DIG. 42, DIG. 43

[56] References Cited

U.S. PATENT DOCUMENTS 5,535,841 7/1996 Cobes, Jr. et al. .................... 180/69.2
5,538,094 7/1996 Cobes, Jr. et al. .................... 180/69.2

FOREIGN PATENT DOCUMENTS

| | | |
|---|---|---|
| 61-282173 A | 12/1986 | Japan . |
| 403025084 | 2/1991 | Japan .................................. 180/69.2 |
| 4-262977 A | 9/1992 | Japan . |
| 4-372475 A | 12/1992 | Japan . |
| 6-312670 A | 11/1994 | Japan . |
| 2 268 130 | 1/1994 | United Kingdom . |

Primary Examiner—Brian L. Johnson
Assistant Examiner—Michael Mar
Attorney, Agent, or Firm—Trop, Burner, Hu & Miles, P.C.

[57] ABSTRACT

An object of an automotive hood structure of the present invention is to increase the hood strength and make it possible to decrease the sheet thickness of a hood inner 2 without the complicated shape of a hood inner 2 around a striker 3 or the increased size of the striker 3. A reinforcement 4, comprising a top flat portion 41 and flange portions 42, and the striker 3 are disposed between a hood outer 1 and the hood inner 2. A flange portion 31$a$ of the striker 3 is lapped on the flange portion 42 of the reinforcement 4, and welded to the hood inner 2. The top flat portion 41 is fixedly bonded to the inside surface of the hood outer 1.

1 Claim, 4 Drawing Sheets

AUTOMOTIVE HOOD STRUCTURE

This is a continuation of application Ser. No. 08/445,185, filed May 19, 1995, now abandoned.

FIELD OF THE INVENTION AND RELATED ART STATEMENT

The present invention relates to an automotive hood structure and, more particularly, to a reinforcing structure around a striker of hood.

For the automotive hood, the outside shape thereof is formed by a hood outer 1 and a hood inner 2 as shown in FIG. 1. At the center tip end of the hood inner 2, a flat portion 21 is formed and a striker 3 is disposed thereon as shown in FIG. 5. The striker 3 is inserted in a hole 51 of a radiator grille 5, and locked by means of a lock member (not shown) disposed in the hole 51.

The details of the hood structure around the striker 3 are shown in FIGS. 5 and 6. The striker 3 is made up of a bracket 31 having flange portions 31*a* and a U-shaped striker piece 32 having bases 32*a* for installation, which are made of a round bar or the like, and is formed by welding the bases 32*a* of the striker piece 32 to the bracket 31. The striker 3 is disposed between the hood outer 1 and the hood inner 2. The flange portion 31*a* of the bracket 31 is fixed to the inside surface of the flat portion 21 of the hood inner 2 so that the striker piece 32 protrudes downward from the hood inner 2.

As the weight of automobile is decreased, the thickness of sheet of the hood inner 2 is made smaller. The smaller thickness of hood inner 2 results in the shortage of strength especially around the striker 3 to which an excessive force is applied when the hood is closed. Therefore, the deformation of hood inner 2, or the deformation or falling of striker 3 may occur.

For this reason, the shape of the hood inner must be complicated to increase the stiffness thereof, or the diameter of the base 32*a* of the striker piece 32 must be increased to enhance the installation strength of the striker 3.

Japanese Patent Provisional Publication No. 4-372475 (No. 372475/1992) has disclosed a hood structure in which a reinforcement is disposed between the hood outer and the hood inner, and a striker is installed on the hood inner.

OBJECT AND SUMMARY OF THE INVENTION

An object of the present invention is to provide an automotive hood structure in which the hood strength is increased the sheet thickness of a hood inner can be decreased without the complicated shape of the hood inner or the increased size of a striker.

To solve the above problems, in an automotive hood structure in which a reinforcement and a striker are disposed between a hood inner and a hood outer, the reinforcement comprises a top flat portion and flange portions, the flange portion of the striker is lapped on the flange portion of the reinforcement, and welded to the hood inner, and the top flat portion of the reinforcement is fixedly bonded to the inside surface of the hood outer.

In the automotive hood structure of the present invention, the top flat portion of the reinforcement is fixedly bonded to the inside surface of the hood outer, so that the force from the striker is distributed to the hood outer. Therefore, the strength is increased. Also, since a closed cross section structure is formed by the reinforcement and a bracket of the striker, the installation strength of the striker is increased.

Further scope of applicability of the present invention will become apparent from the detailed description given hereinafter.

However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF PREFERRED EMBODIMENTS

Figure 1:
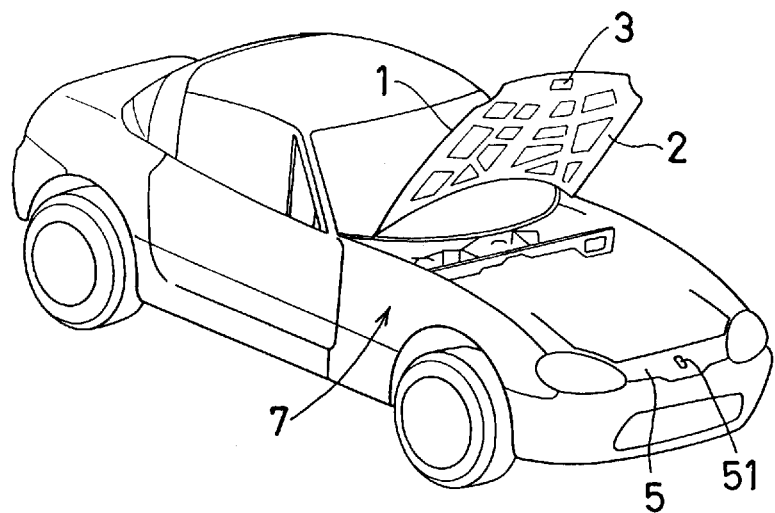
FIG. 1 is a perspective view of an automobile to which the hood structure of the present invention is applied.

The embodiment of the present invention will be described below with reference to the drawings.

The automotive hood, whose outside shape is formed by a hood outer 1 and a hood inner 2, is installed to a body 7 of automobile via opening/closing members 6. At the center tip end of the hood inner 2, a striker 3 is disposed. The striker piece 32 of the striker 3 is inserted in a hole 51 formed in a radiator grille 5, and locked by means of a lock member (not shown) on the inside when the car is running.

Figure 2:
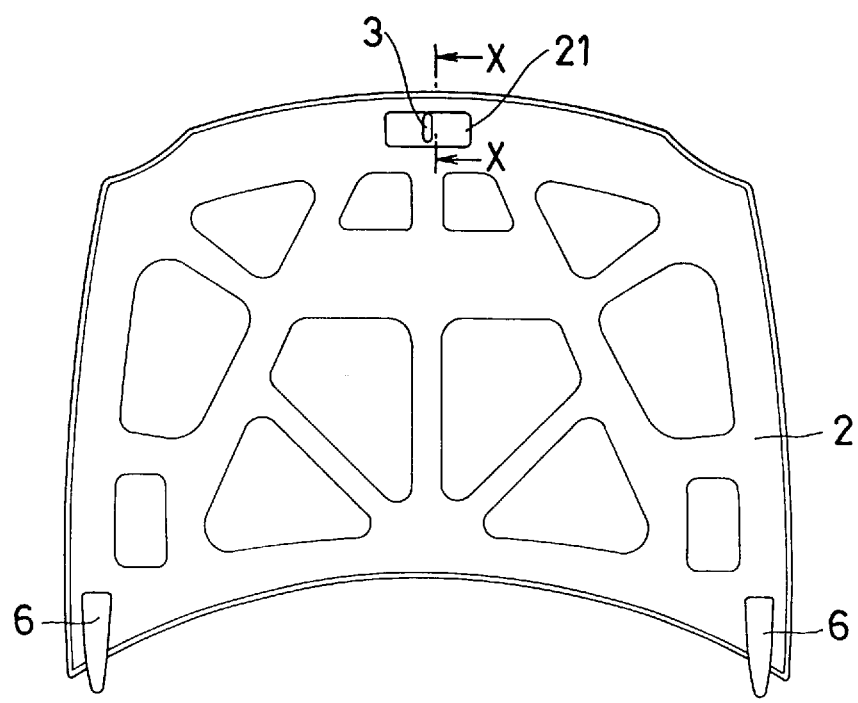
FIG. 2 is a plan view of the inside of hood in the hood structure of the present invention.
Figure 3:
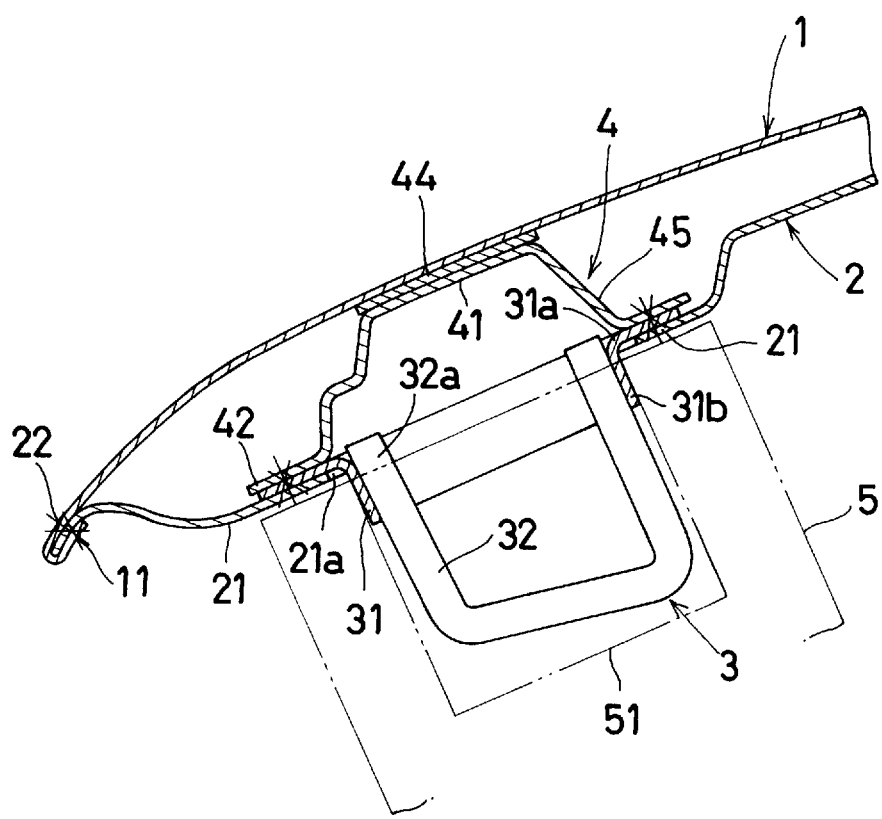
FIG. 3 is an enlarged sectional view taken along the line X—X of FIG. 2.

FIG. 3 is a sectional view taken along the line X—X of FIG. 2, showing the structure around the striker 3 at the center tip end of the hood. At the center tip end of the hood inner 2, a flat portion 21 is formed, and at the center of the flat portion 21, an opening 21*a* is formed to dispose the striker 3 in such a manner as to protrude downward.

The striker 3 is made up of a bracket 31 and a striker piece 32. The bracket 31 comprises a flange portion 31*a* and wall portions 31*b* for supporting the striker piece 32 installed at the center of the bracket 31. The striker 32 is formed by a U-shaped round bar or the like, and the upper end thereof is fixedly supported by the wall portions 31*b* of the bracket 31 by welding or by other methods.

The striker 3 is fixed to the hood inner 2 and a reinforcement 4 via the flange portion 31*a* by welding.

The reinforcement 4 is formed with flange portions 42 at both ends, rise portions 45 on both sides, and a top flat portion 41 protruding at the center by sheet metal pressing. The top flat portion 41 is divided into three by grooves 43. At the center of the flange portion 42, a step portion 42*a* is formed to lap the flange portion 31*a* of the striker 3 (refer to FIG. 4).

Figure 4:
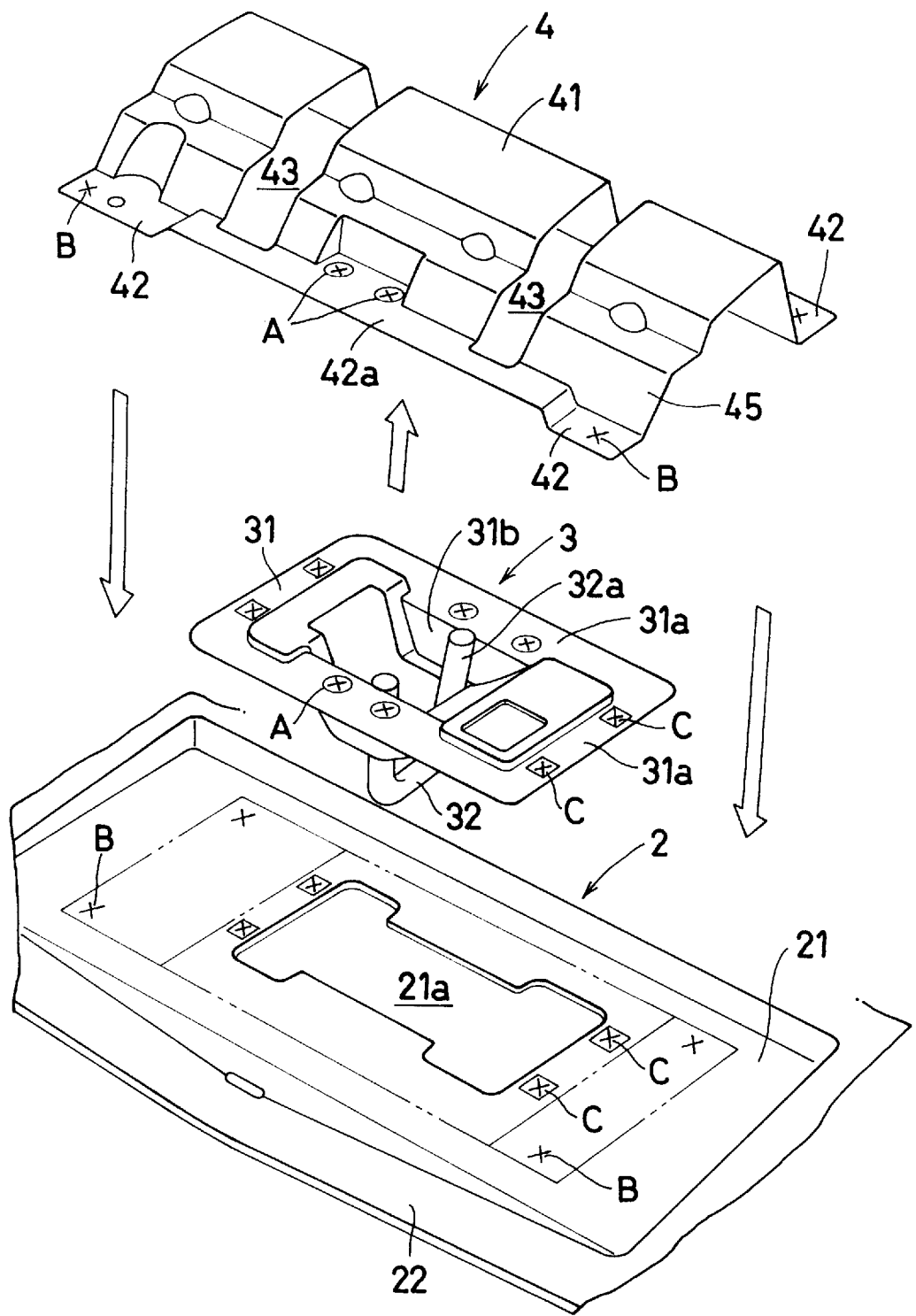
FIG. 4 is an exploded perspective view showing the installation construction of a striker of the present invention.
Figure 5:
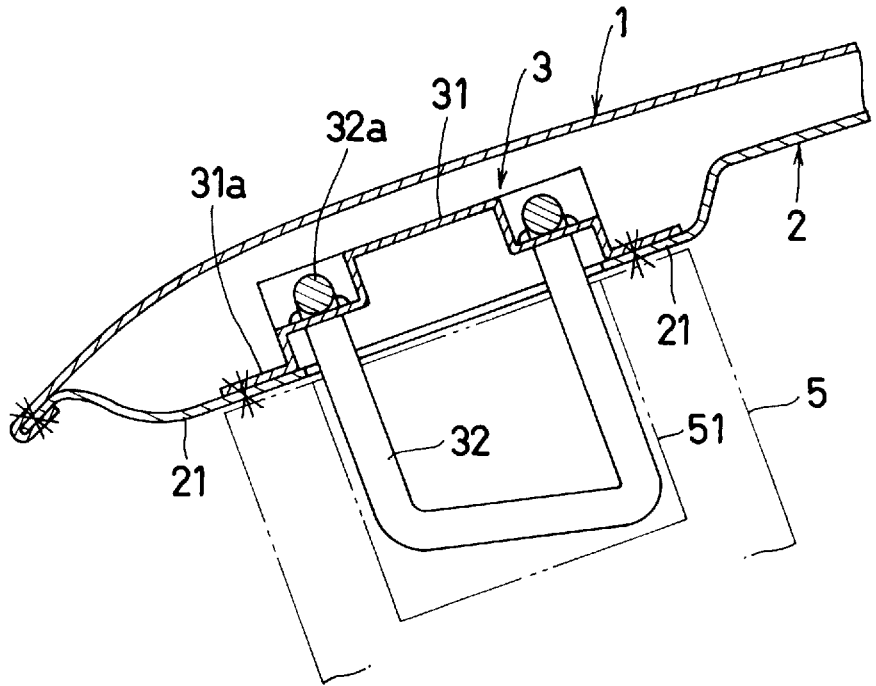
FIG. 5 is a sectional view, the same as FIG. 3, showing a conventional hood structure.
Figure 6:
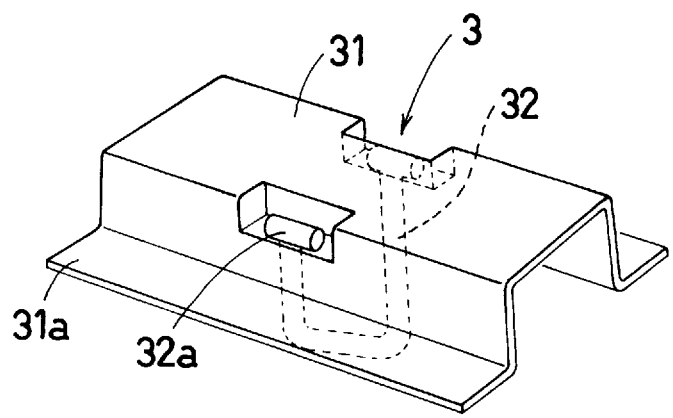
FIG. 6 is a perspective view of a striker used in a conventional hood structure.

Next, the installation construction of the striker 3 will be described with reference to FIG. 4.

The striker piece 32 is fixed to the wall portions 31*b* of the bracket 31 by welding with the striker piece facing downward. The flange portion 31a of the striker 3 is lapped on the step portion 42a of the flange portion 42 from the lower side of the reinforcement 4. With the flange portion 31a being lapped on the flange portion 42a, both flange portions 31a and 42a are fixed to each other by welding (A) so that a closed cross section structure is formed by the striker 3 and the reinforcement 4.

The striker 3 is inserted in the opening 21a formed at the flat portion 21 of the hood inner 2, and the flange portions 42 of the reinforcement 4 are fixed to the hood inner 21 by welding (B). The flange portion 31a of the striker 3 is welded (C) to the flat portion 21 of the hood inner 2. At this time, the welding equipment for spot welding is inserted into the welding places (C) through the grooves 43 provided on the top flat portion 41 of the reinforcement 4.

Finally, adhesive 44 is applied to the top flat portion 41 of the reinforcement 4. With the top flat portion 41 being bonded to the inside surface of the hood outer 1, the hood inner 2 is mounted to the hood outer 1, and the peripheral portion 22 of the hood inner 2 is folded and welded at the peripheral portion 11 of the hood outer 1.

In this embodiment, a closed cross section structure is formed by lapping the striker 3 on the reinforcement 4, so that the stiffness is increased, by which deformation is prevented.

Also, the striker 3 is fixed to the hood inner 2 via the flange portion 31a, and also fixed to the hood outer 1 via the reinforcement 4. Therefore, the shock caused when the hood is close is distributed to the hood inner 2 and the hood outer 1, so that the deformation of the hood inner 2 and the striker 3 decreases. As a result, if the sheet thickness of hood is small, the deformation of the hood inner 2, or the deformation or falling of the striker 3 does not occur.

Further, in the case where the clearance between the hood outer 1 and the hood inner 2 differs around the striker 3 on another automobile with a different hood shape, the striker 3 can be used without changing the shape thereof by changing the height etc. of the reinforcement 4, which is easily fabricated. Therefore, the common use of part can be effected easily.

As seen from the above description, the force from the striker 3 is distributed to the hood outer 1, so that the strength is increased. Also, a closed cross section structure is formed by the reinforcement 4 and the striker 3. Therefore, an automotive hood structure can be provided in which the sheet thickness of the hood inner 2 can be decreased without the complicated shape of the hood inner 2 or the increased size of the striker 3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An automotive hood structure in which a reinforcement and a striker arc disposed between a hood outer and a hood inner, said striker disposed in an opening in said hood inner, wherein said reinforcement comprises a top flat portion and a flange portion, and said striker including a flange portion and the flange portion of said striker is lapped on said flange portion of said reinforcement and welded to said hood inner, and said reinforcement top flat portion is fixedly bonded to said hood outer, wherein said striker comprises a bracket including said striker flange portion and a striker piece bonded to said bracket, such that said striker and said reinforcement form a structure with a closed cross-sectional configuration for greater rigidity, and wherein said top flat portion of said reinforcement is divided by a plurality of grooves, said grooves adapted to allow said striker flange portion to be welded to said reinforcement flange portion and said hood inner to be welded to said reinforcement flange portion and said striker flange portion to be welded to said hood inner.

* * * * *